United States Patent [19]

Scheller

[11] 4,082,131

[45] Apr. 4, 1978

[54] TIRE TREAD STRUCTURE

[76] Inventor: James I. Scheller, 18905 SW. Blamon Ct., Aloha, Oreg. 97005

[21] Appl. No.: 650,123

[22] Filed: Jan. 19, 1976

Related U.S. Application Data

[63] Continuation-in-part of Ser. No. 477,894, Sep. 11, 1974, abandoned.

[51] Int. Cl.² ............................................. B60C 11/14
[52] U.S. Cl. ................................................... 152/210
[58] Field of Search ............... 152/208, 210, 211, 167, 152/168; 156/114; 51/308, 298

[56] References Cited

U.S. PATENT DOCUMENTS

| 3,661,544 | 5/1972 | Whitaker | 51/298 X |
| 3,789,050 | 1/1974 | Loricchio | 152/330 R X |

*Primary Examiner*—Robert B. Reeves
*Assistant Examiner*—John P. Shannon
*Attorney, Agent, or Firm*—Eugene M. Eckelman

[57] ABSTRACT

Particles of garnet are intermixed with rubber compound in the formation of tire tread structures to increase traction with the road surface. The amount of garnet introduced into the tread structure is at least 10% by weight of garnet relative to the weight of rubber compound to obtain maximum traction. The size of the garnet particles that may be used ranges in size from 177 to 841 microns.

1 Claim, No Drawings

TIRE TREAD STRUCTURE

REFERENCE TO RELATED APPLICATIONS

This application is a continuation-in-part of application Ser. No. 477,894, filed Sept. 11, 1974 for The Garnet Tire, abandoned.

BACKGROUND OF THE INVENTION

This invention relates to new and useful tire tread structures and more particularly is concerned with a tire tread structure designed to provide improved traction with the road surface.

Tires have heretofore been provided that have various fillers incorporated in the tread structure to increase the traction with the road surface. Some of such fillers for example have been walnut shells, wire, fiberglass, aluminum oxide, and the like. Such tires however have not been found to be satisfactory in having the combined required features of long wear, economy of manufacture, and good road traction. Tires also have heretofore been provided with metal studs but these traction devices are noisy, are illegal in some states, and where legal can only be used in winter months.

SUMMARY OF THE INVENTION

According to the present invention and forming a primary objective thereof, a tire tread structure is provided that has the combined features of long wear, of being reasonably economical to manufacture, of having good road traction, and generally of being legal in all states the year around. To accomplish these objectives, garnet particles are intermixed in the rubber compound which is used to make tire tread so that the tire has improved traction with the road surface and at the same time has long wearing qualities and other features mentioned. The particle size of the garnet may vary but it is important that the amount of garnet used be at least 10% by weight of the rubber in the tread in order to accomplish the desired road traction.

DESCRIPTION OF A PREFERRED EMBODIMENT

As stated hereinbefore, the present tire incorporates the combination of garnet particles in the rubber compound which is used to form the tread. As is well known, garnet is a stone mined in the United States and is relatively hard, having a hardness of 7.4 to 7.8 compared to the diamond which has a MOH of 10.

In the present invention, the garnet used with the rubber compound is reduced in size to form small crystals. A preferred size ranges from 177 to 841 microns, the range of 420 to 595 microns being the size mostly used. Such pre-sizing of the garnet is essential to the maximum efficiency of the invention. That is, the crystals formed by such presizing have a natural pattern with 12 to 24 sides. This pattern provides a good holding grip within the tire tread so that the particles will remain locked in the tread even though a great centrifugal force acts thereon and a projecting portion repeatedly engages the road surface.

The garnet particles are first washed in solution before being intermixed with the rubber compound.

Preferably, the amount of garnet mixed with the rubber compound in the formation of the tire tread is at least 10% by weight of the weight of the rubber compound in the tread. For example, the per weight mixture of garnet particles in a tread weight of 16 pounds is at least 1.6 pounds. This provides a tire tread which possesses at least or greater the stopping ability of the studded tire. In actual tests of the garnet tires of the invention and existing studded tires, wherein an average of five consistent passes were taken at 10 miles per hour, the studded tires required a stopping distance of 38.02 feet and the garnet tires required a stopping distance of 37.08 feet. This shows a difference of 11.28 inches or a 2½% better stopping performance by the garnet tires.

In accordance with the invention, a tire structure is provided that has at least or better the traction qualities of existing tires for use on ice and snow and at the same time is economically feasible and of substantial long wear. The present tire structure will generally be legal for use in all the states and further yet can be used the year around whereby the safety features thereof exist all the time and not only in the winter.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A tire tread structure comprising a base composition of rubber or the like and garnet particles intermixed in the rubber composition, said garnet particles having a naturally irregular, multiple sided configuration with a plurality of sharpened protruding edges, whereby the irregular shape of said particles holds said particles in the tire tread with portions thereof protruding from the road engaging surface of the tire tread to engage the road surface and add traction between the tire and the road, the amount of garnet particles in said tread structure being at least 10% by weight relative to the weight of the rubber composition, said garnet particles ranging in size from 177 to 841 microns.

* * * * *